(12) United States Patent
Jefford et al.

(10) Patent No.: US 10,253,900 B2
(45) Date of Patent: Apr. 9, 2019

(54) LATCHING VALVE ASSEMBLY HAVING POSITION SENSING

(71) Applicant: Continental Automotive Systems, Inc., Auburn Hills, MI (US)

(72) Inventors: Robert Douglas Jefford, Chatham (CA); William John Boucher, Chatham (CA); David William Balsdon, Chatham (CA); Raymond Rasokas, Chatham (CA)

(73) Assignee: Continental Automotive Systems, Inc., Auburn Hills, MI (US)

( * ) Notice: Subject to any disclaimer, the term of this patent is extended or adjusted under 35 U.S.C. 154(b) by 153 days.

(21) Appl. No.: 14/708,354

(22) Filed: May 11, 2015

(65) Prior Publication Data

US 2015/0345652 A1    Dec. 3, 2015

Related U.S. Application Data

(60) Provisional application No. 62/003,304, filed on May 27, 2014, provisional application No. 62/126,007, filed on Feb. 27, 2015.

(51) Int. Cl.
*F16K 1/32* (2006.01)
*H01F 7/16* (2006.01)
(Continued)

(52) U.S. Cl.
CPC ......... *F16K 21/14* (2013.01); *F02M 25/0836* (2013.01); *F16K 1/32* (2013.01);
(Continued)

(58) Field of Classification Search
CPC .... F16K 21/14; F16K 31/082; F16K 31/0655; F16K 31/10; F16K 37/0041; F16K 1/32; F02M 25/0836; F02M 2025/0845
(Continued)

(56) References Cited

U.S. PATENT DOCUMENTS 3,895,331 A * 7/1975 Saarem ............... F16K 31/0679
335/171
4,771,255 A * 9/1988 Shull ....................... H01F 7/124
335/169
(Continued)

FOREIGN PATENT DOCUMENTS

CA          2428773 A1 * 11/2003    ......... F02M 25/0836
CN         201050615 Y      4/2008
(Continued)

OTHER PUBLICATIONS

German Office Action dated Jul. 28, 2017 for corresponding German patent application No. 10 2015 209 195.5.
(Continued)

*Primary Examiner* — Robert K Arundale
*Assistant Examiner* — Daphne M Barry

(57) ABSTRACT

A latching valve assembly which controls the flow of air and purge vapor between a fuel module and a carbon canister, where a change in an electrical property of the latching valve assembly is used to detect whether the latching valve is in the open position or the closed position. The latching valve assembly of the present invention eliminates the need for a physical switch solution, mechanical or non contact solutions, eliminates complexity of valve hardware requirements, and only adds minor electric components and software to identify the latch position. This system eliminates valve complexity and mechanical connections required for electrical conductivity.

4 Claims, 12 Drawing Sheets

(51) Int. Cl.
  *H01F 7/18*  (2006.01)
  *F02M 25/08*  (2006.01)
  *F16K 21/14*  (2006.01)
  *F16K 31/06*  (2006.01)
  *F16K 31/08*  (2006.01)
  *F16K 31/10*  (2006.01)
  *F16K 37/00*  (2006.01)

(52) U.S. Cl.
  CPC ........ *F16K 31/0655* (2013.01); *F16K 31/082* (2013.01); *F16K 31/10* (2013.01); *F16K 37/0041* (2013.01); *H01F 7/1844* (2013.01); *F02M 2025/0845* (2013.01); *H01F 7/1615* (2013.01); *H01F 2007/185* (2013.01)

(58) Field of Classification Search
  USPC .......................... 251/129.01, 129.05, 129.15
  See application file for complete search history.

(56) References Cited

U.S. PATENT DOCUMENTS

| | | | | |
|---|---|---|---|---|
| 5,245,501 A | * | 9/1993 | Locher | B60T 8/36 324/381 |
| 6,321,781 B1 | * | 11/2001 | Kurth | F16K 31/0655 137/554 |
| 8,122,963 B2 | * | 2/2012 | Davis | E21B 33/0355 166/250.01 |
| 9,068,668 B2 | * | 6/2015 | Grover | F16K 31/0655 |
| 9,683,523 B2 | * | 6/2017 | Balsdon | F02M 25/0818 |
| 9,732,705 B2 | * | 8/2017 | Balsdon | F02M 25/089 |
| 9,784,224 B2 | * | 10/2017 | Weldon | F02M 26/67 |
| 2007/0241298 A1 | * | 10/2007 | Herbert | F16K 7/16 251/129.04 |
| 2014/0042347 A1 | * | 2/2014 | Williams | F16K 31/0606 251/129.02 |

FOREIGN PATENT DOCUMENTS

| | | |
|---|---|---|
| CN | 103423503 A | 12/2013 |
| CN | 203453586 U | 2/2014 |
| DE | 102014219268 A1 | 4/2015 |

OTHER PUBLICATIONS

Chinese Office Action dated Aug. 1, 2017 for corresponding Chinese patent application No. 201510276894.1.

* cited by examiner

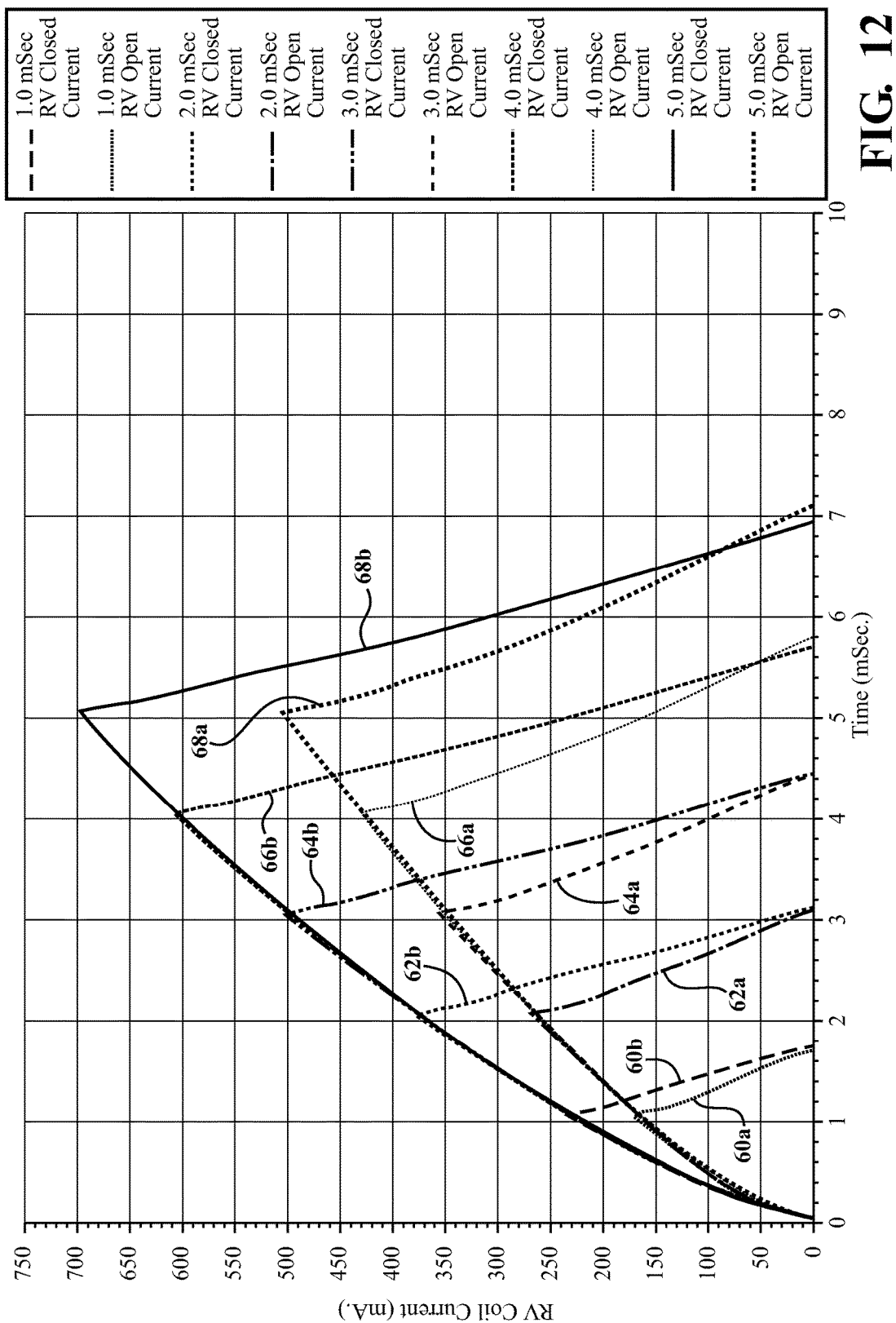

LATCHING VALVE ASSEMBLY HAVING POSITION SENSING

CROSS-REFERENCE TO RELATED APPLICATIONS

This application claims the benefit of U.S. Provisional Application No. 62/003,304 filed May 27, 2014, and U.S. Provisional Application No. 62/126,007 filed Feb. 27, 2015. The disclosures of the above applications are incorporated herein by reference.

FIELD OF THE INVENTION

The invention relates generally to a latching valve assembly which has a latching mechanism that is able to hold a valve in an open position and a closed position, where the latching valve assembly is controlled by a circuit, and a change is detected in an electrical property of the circuit to identify the position of the latching mechanism, and therefore identify the position of the valve.

BACKGROUND OF THE INVENTION

There are many different types of valve assemblies, which are actuated by different methods. One type of valve assembly is used to control the flow of air and purge vapor between a fuel module of a fuel tank, and a carbon canister. Some types of valve assemblies include solenoids which control the position of some type of valve member, and are used to change the valve member between open and closed positions. It is often necessary to have some type of sensor device to detect the position of the valve member when the valve member is in the open position or the closed position. One example of an existing design approach is to use a mechanical sensing system through a reed switch, MR position sensor, mechanical switch or other position sensing either through contact or non contact methods. However, these types of solutions add more components, and increase cost.

Other types of approaches include using a pressure sensor in the fuel tank which determines position by monitoring pressure changes in the fuel tank as the valve assembly is changed between an open position and a closed position. However, this approach is not effective in applications which implement bleed flows in the valve assembly.

Accordingly, there exists a need for an approach to detect the position of a valve assembly which does not add unnecessary components, but is still effective in detecting the position of the valve assembly.

SUMMARY OF THE INVENTION

The present invention is a latching valve assembly which controls the flow of air and purge vapor between a fuel module and a carbon canister, where a change in an electrical property of the latching valve assembly is used to detect whether the latching valve is in the open position or the closed position. The latching valve assembly of the present invention eliminates the need for a physical switch solution, mechanical or non contact solutions, eliminates complexity of valve hardware requirements, and only adds minor electric components and software to identify the latch position. This system eliminates valve complexity and mechanical connections required for electrical conductivity.

In one embodiment, the present invention includes a valve portion controlled by a solenoid portion, where the valve portion latches in two positions, an open position and a closed position, and is held in either the open position or the closed position by a latching mechanism. The latching valve assembly uses two different portions of a coil to change the position of a valve assembly and detect the position of the valve assembly.

In each position, the armature is at rest at different locations within the solenoid. This results in a change in coil inductance that is electronically measured in one of the portions of the coil to identify the position of the valve portion when solenoid portion is inactive. With this embodiment, the position of the valve portion may be detected with one additional connector pin (using a ground common with the valve coil). This embodiment includes a separate coil wind that is used to enhance signal to noise ratio and part to part variation of inductance measurement.

In another embodiment, the present invention is a latching valve assembly which includes a solenoid portion having a magnet path, and a valve portion having an open position and a closed position, where the valve portion controlled by the solenoid portion. The valve assembly also includes a latching mechanism for maintaining the position of the valve position in the open position or the closed position when the solenoid portion is deactivated. A voltage pulse is emitted to the solenoid portion and used to detect whether the valve position is in the open position or the closed position. The voltage pulse is emitted over a time interval such that the latching mechanism and valve portion remain stationary, and is not long enough to actuate the latching mechanism or valve portion.

The solenoid portion includes an armature connected to the valve portion, and a coil substantially surrounding the armature, where the coil is also part of the solenoid portion. The armature is in a first position relative to the coil when the valve portion is in the closed position, and a second position relative to the coil when the valve portion is in the open position, such that different current measurements are produced when the armature is in the first position or the second position. The different current measurements correspond to whether the valve portion is in the open position or the closed position.

In an alternate embodiment, a magnet is disposed on the armature. The magnet is disposed in the magnet path when the valve portion is in the open position, and the magnet is out of the magnet path when the valve portion is in the closed position. The position of the valve assembly is detected by emitting more than one voltage pulse into the solenoid portion, and measuring the current generated by each voltage pulse. A different level of current is measured when the magnet is in the magnet path compared to when the magnet is out of the magnet path.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 12 is a chart depicting various current measurements taken during the operation of a third embodiment of a latching valve assembly, according to embodiments of the present invention.

DETAILED DESCRIPTION OF THE PREFERRED EMBODIMENTS

Figure 1:
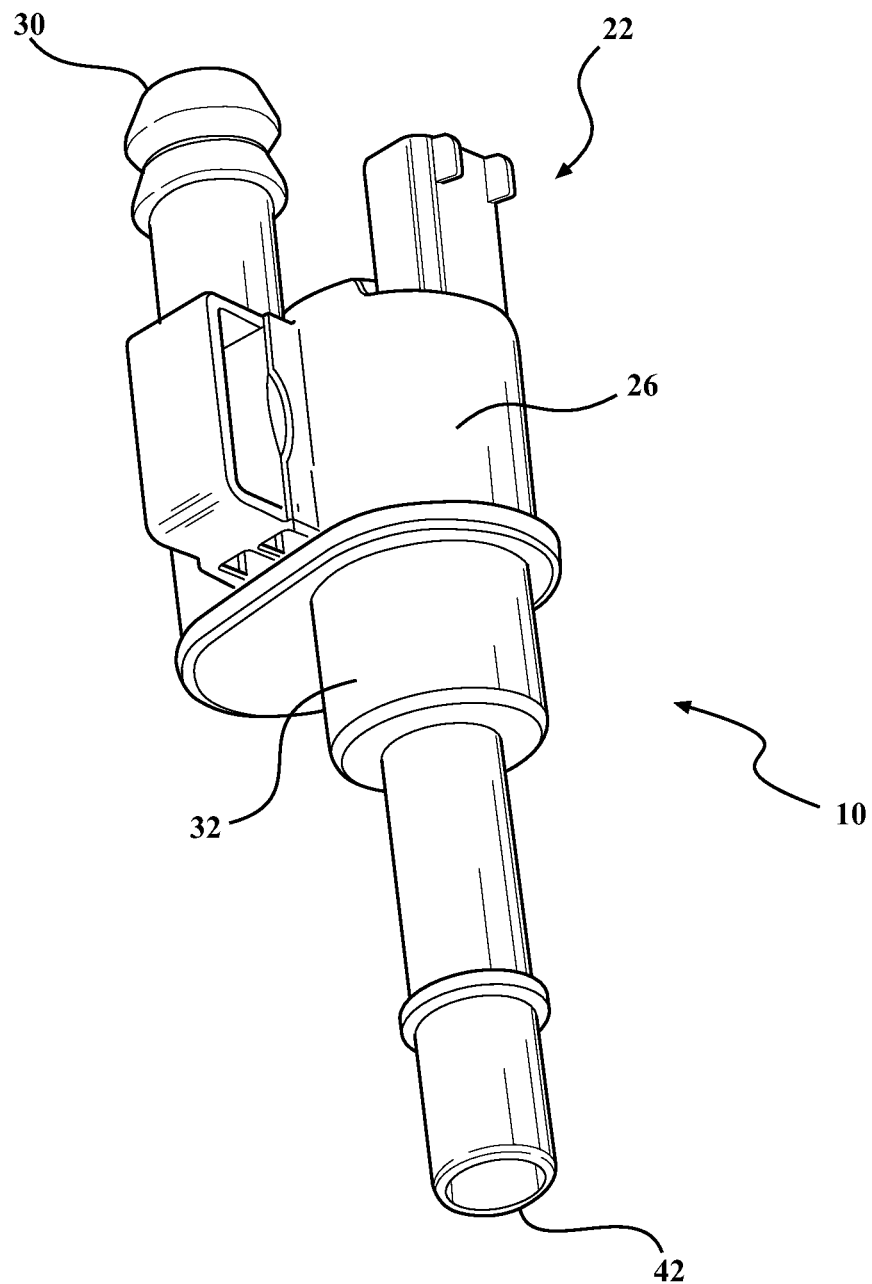
FIG. 1 is a perspective view of a latching valve assembly, according to embodiments of the present invention.

The following description of the preferred embodiment(s) is merely exemplary in nature and is in no way intended to limit the invention, its application, or uses.

A latching valve assembly according to the present invention is shown in the Figures generally at 10. The valve assembly 10 includes a solenoid portion, shown generally at 12, and a valve portion, shown generally at 14. The solenoid portion 12 operates to change the valve portion 14 between an open position, shown in FIG. 2, and a closed position, shown in FIG. 3.

The solenoid portion 12 includes an armature 16 connected to the valve portion 14. Surrounding the armature 16 is a bobbin 18, and surrounding the bobbin 18 is a coil 20 having a first portion 20a and a second portion 20b. Both portions 20a,20b of the coil 20 are in electrical communication with a connector, shown generally at 22. The connector 22 includes a plurality of terminals. More specifically, the connector 22 includes a first terminal, a second terminal, and a third terminal. The first terminal is in electrical communication with the both portions 20a,20b of the coil 20, the second terminal is in electrical communication with only the second portion 20b of the coil 20, and the third terminal is in electrical communication with only the first portion 20a of the coil 20.

The first portion 20a of the coil 20 is has a resistance of around 20 Ohms, and the second portion 20b of the coil 20 has a resistance of about less than 5 Ohms, but it is within the scope of the invention that other levels of resistance may be used.

Figure 2:
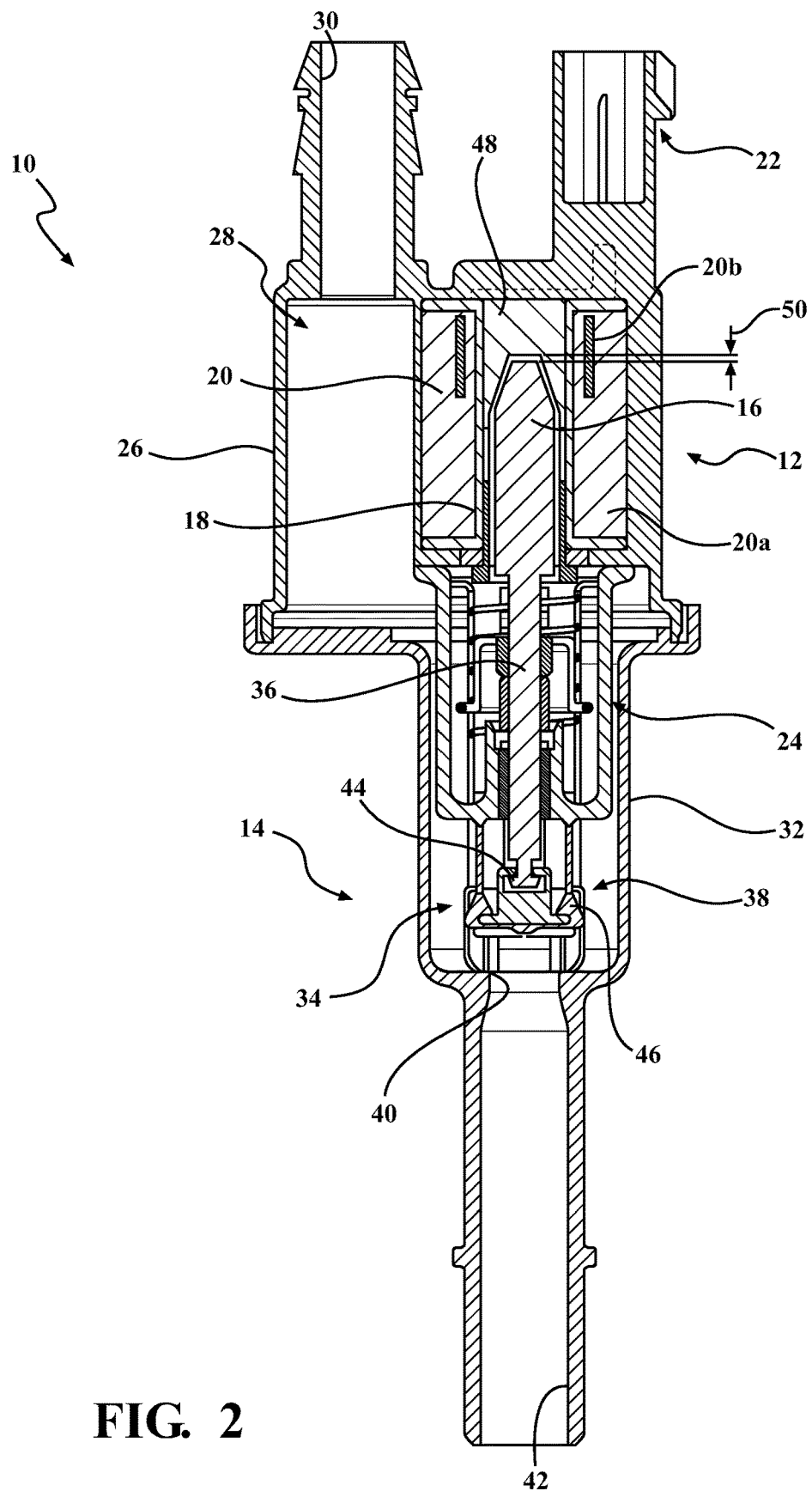
FIG. 2 is a sectional side view of a first embodiment of a latching valve assembly in an open position, according to embodiments of the present invention.
Figure 3:
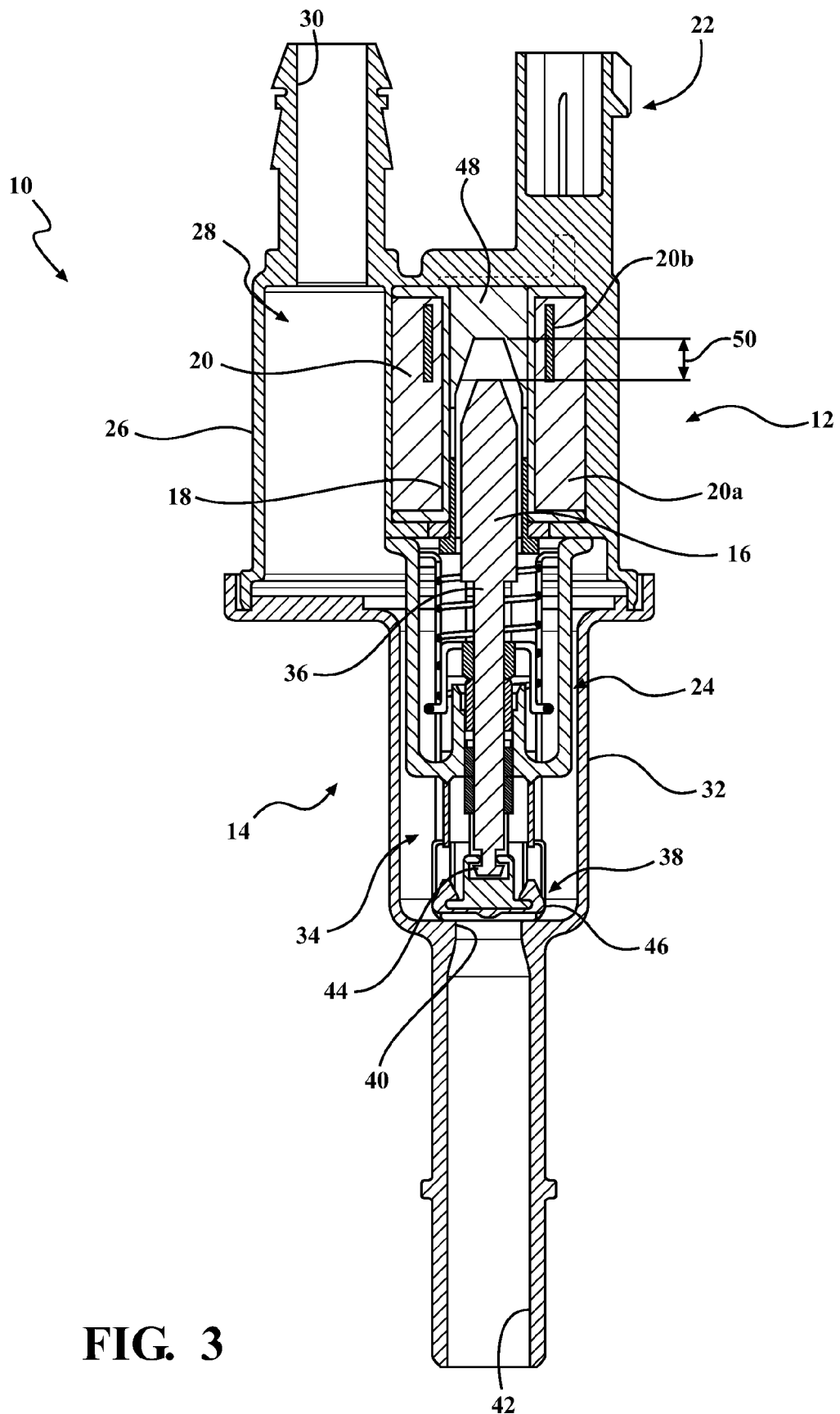
FIG. 3 is a sectional side view of a first embodiment of a latching valve assembly in a closed position, according to embodiments of the present invention.

When the valve portion 14 is in the closed position and the armature 16 is in a first position, as shown in FIG. 3, and a current is applied to the first portion 20a of the coil 20 using the first and third terminals, the armature 16 moves to a second position shown in FIG. 2 such that the valve portion 14 is in the open position. The valve portion 14 is held in the open position by a latching mechanism, shown generally at 24, which has multiple positions. The latching mechanism 24 may be one similar to the latching mechanism described in U.S. application Ser. No. 14/487,448, the entire disclosure of which is incorporated herein by reference. One of the positions of the latching mechanism 24 functions to hold the valve portion 14 in the open position as shown in FIG. 2, such that the coil 20 may be de-energized when the coil 20 is not being used to change the valve portion 14 between the open position and closed position.

The solenoid portion 12 is located in an overmold assembly 26, where the overmold assembly 26 includes an overmold assembly cavity, shown generally at 28, that is in fluid communication with a first port 30, where the first port 30 is connected to and in fluid communication with a carbon canister. Connected to the overmold assembly 26 is a reservoir 32 having a reservoir cavity, shown generally at 34. The valve portion 14 is partially disposed in the overmold assembly 26 and is adjacent the overmold assembly cavity 28. A portion of the valve portion 14 is also partially disposed in the reservoir cavity 34. Formed as part of the armature 16 is an extension rod 36, which is part of the latching mechanism 24. Connected to the extension rod 36 is a valve member, shown generally at 38, which is selectively in contact with a valve seat 40, where the valve seat 40 is formed as part of the reservoir 32. Also formed as part of the reservoir 32 is a second port 42, which is in fluid communication with the reservoir cavity 34. The second port 42 is connected to and in fluid communication with a fuel module of a fuel tank. The valve member 38 includes a rigid core member 44 connected to the rod 36, and a flexible stopper portion 46 connected to the core member 44, and selectively in contact with the valve seat 40.

There is also a stator insert 48 which is part of the solenoid portion 12, and surrounded by the bobbin 18. There is a gap 50 between the stator insert 48 and the armature 16, where the gap 50 fluctuates in size, depending on whether or not the valve member 38 is in contact with the valve seat 40, and the armature 16 is in the first position or second position.

To change the valve member 38 between open and closed positions, and the valve portion 14 is in the closed position, as shown in FIG. 3, a current is applied to the first portion 20a of the coil 20, causing the armature 16 to move towards the stator insert 48 and the valve member 38 to move away from the valve seat 40, decreasing the size of the gap 50. The configuration of the latching mechanism 24 changes as the armature 16 moves relative to the latching mechanism 14, regardless of whether the valve member 38 is in the open position of the closed position. Once the valve member 38 has moved far enough away from the valve seat 40, the configuration of the latching mechanism 24 changes to maintain the valve member 38 in the open position, even when current is no longer applied to the coil 20. The coil 20 is then de-energized, allowing the armature 16 and valve member 38 move a small amount away from the stator insert 48, and be held in the open position because of the configuration of the latching mechanism 24. Once the valve member 38 is in the open position and the armature 16 is in the second position, there is established fluid communication between the first port 30 and the second port 42 through the cavities 28,34.

When it is desired to move the valve member 38 back to the closed position and the armature 16 back to the first position, a current is again applied to the first portion 20a of the coil 20, to move the armature 16, rod 36, and valve member 38 towards the stator insert 48, reconfiguring the latching mechanism 24 such that when the current is no longer applied to the coil 20, the armature 16, rod 36, and valve member 38 move towards and contact the valve seat 40, placing the valve member 38 back in the closed position, as shown in FIG. 3.

When the armature 16 is moved to change the valve portion 14 between the open position and closed position, there is a change in inductance in the second portion 20b of the coil 20, depending upon the position of the armature 16 relative to the coil 20. A smaller gap 50 produces higher levels of inductance, and a larger gap 50 produces lower levels of inductance. There is one level of inductance measured when the armature 16 is in the position shown in FIG. 2, and another level of inductance measured when the armature 16 is in the position shown in FIG. 3. This change in inductance in the second portion 20b of the coil 20 is measured through the first and second terminals. The change in inductance is measured by emitting a 12 Volt pulse through the second portion 20b of the coil 20. In one embodiment, the voltage pulse typically lasts between 5-15 milliseconds, and is therefore not long enough, or strong enough, to move the armature 16, but is significant enough to cause a change in inductance in the coil 20b that is measurable. It should be noted that it is within the scope of the invention that the voltage pulse used to detect the position of the valve portion 14 may last for longer or shorter time intervals, as long as the armature 16 and valve member 38 remain stationary. Because the change in inductance in the second portion 20b of the coil 20 is measured, and the level of inductance change depends on the location of the armature 16 and corresponds to the location of the valve member 38 and the armature 16, the location of the valve member 38 and the armature 16 is therefore detected and used to identify the position of the latching mechanism 24.

Figure 4:
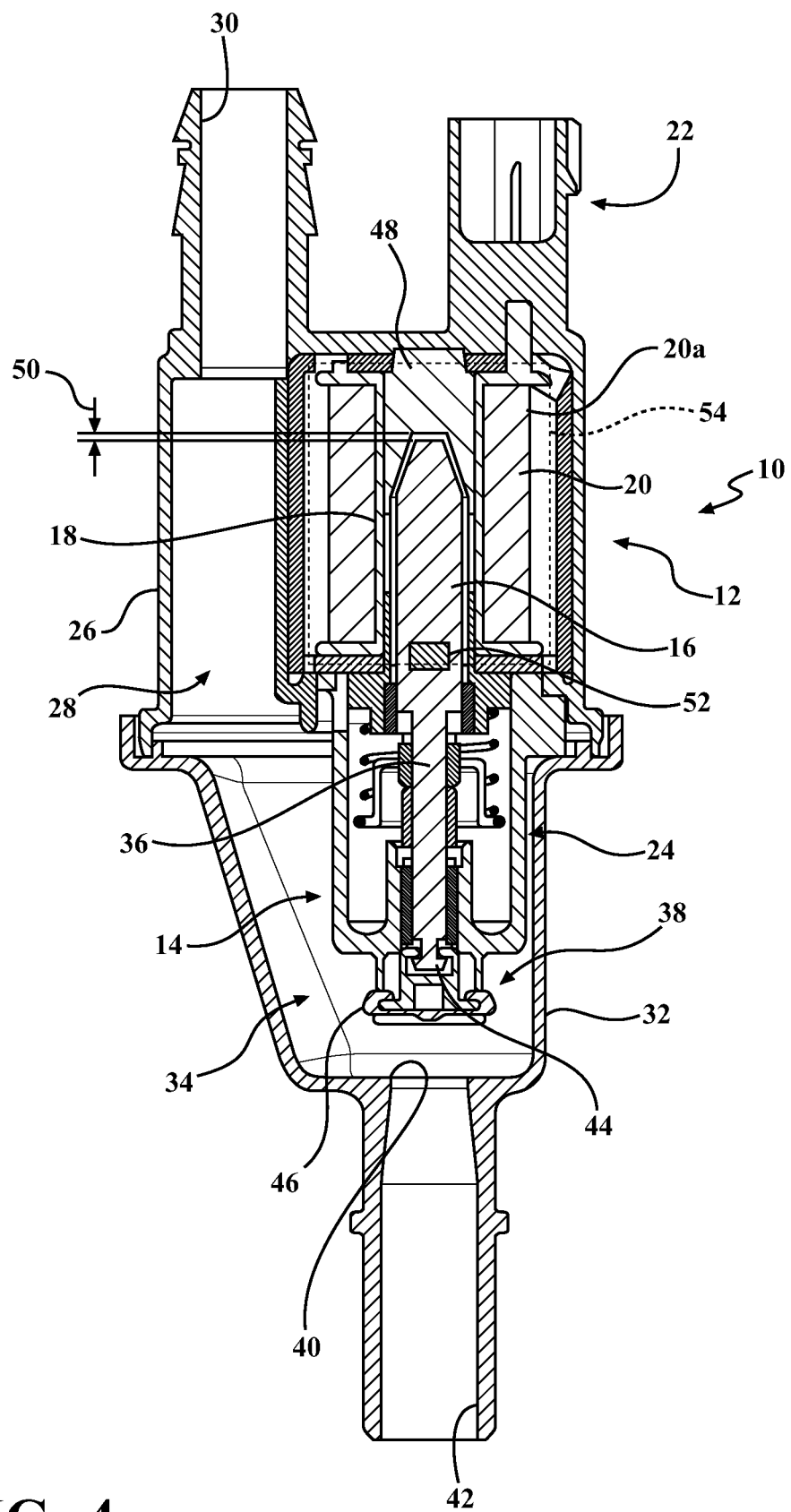
FIG. 4 is a sectional side view of a second embodiment of a latching valve assembly in an open position, according to embodiments of the present invention.
Figure 5:
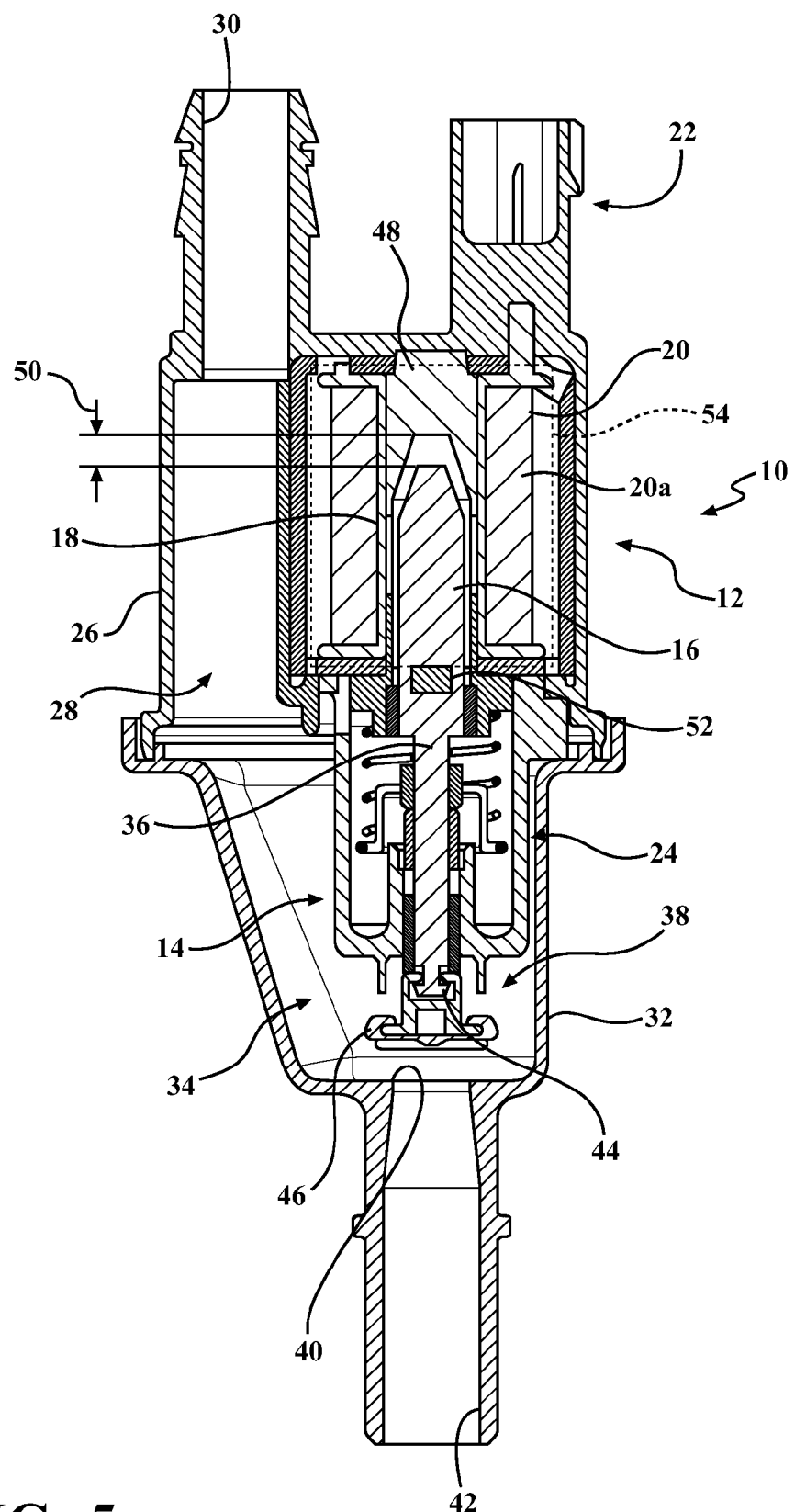
FIG. 5 is a sectional side view of a second embodiment of a latching valve assembly changing between an open position and a closed position, according to embodiments of the present invention.
Figure 6:
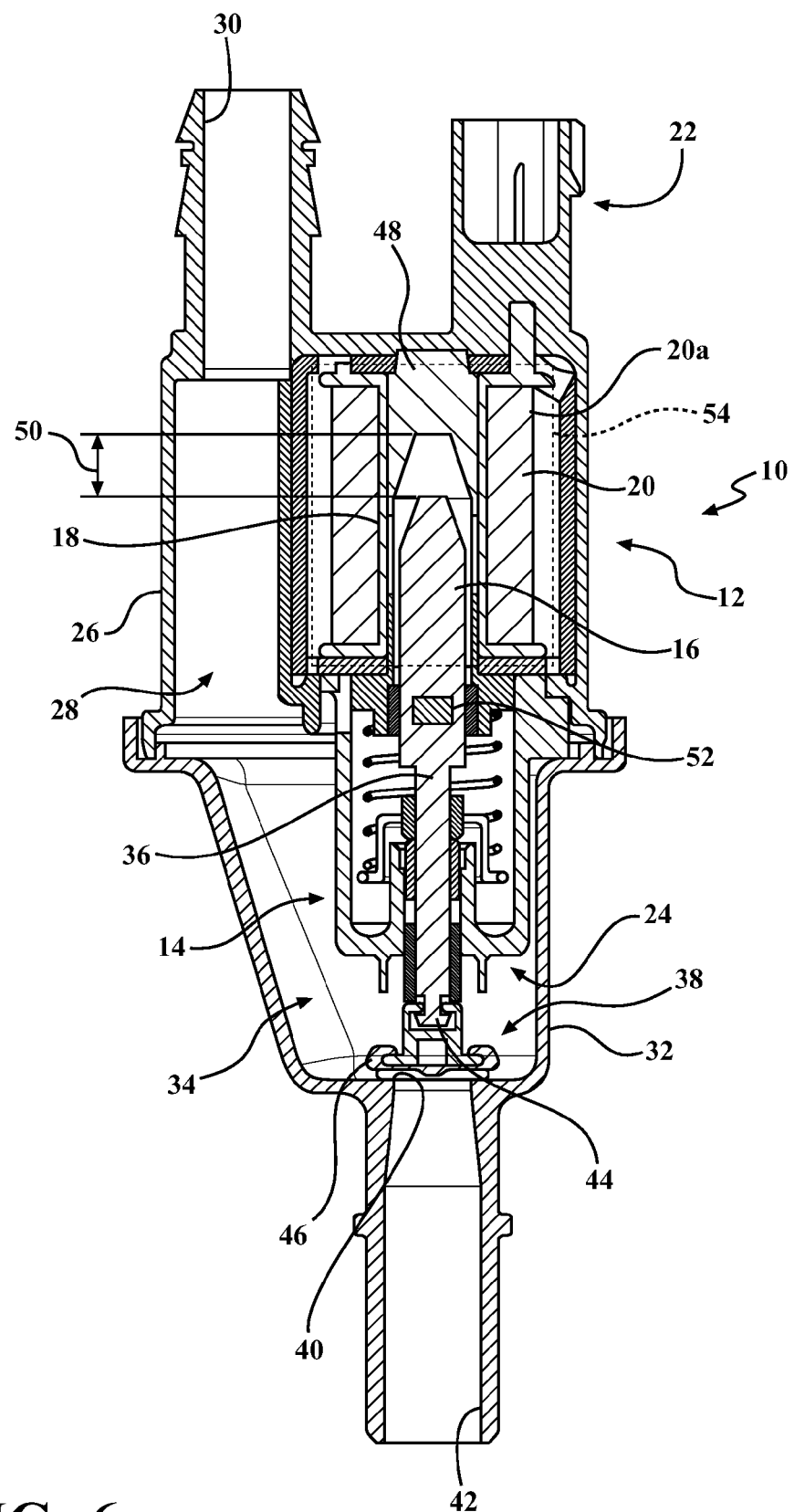
FIG. 6 is a sectional side view of a second embodiment of a latching valve assembly in a closed position, according to embodiments of the present invention.

A second embodiment of the present invention is shown in FIGS. 4-6, with like numbers referring to like elements. In this embodiment, there is a magnet 52 mounted to the armature 16, which moves into a magnet path 54 when the valve portion 14 is in the open position and the armature 16 is in the second position, shown in FIG. 4, and moves out of the magnet path 54 when the valve portion 14 is in the closed position and the armature 16 is in the first position, shown in FIG. 6. As with the previous embodiment, the latching mechanism 24 is able to maintain the position of the valve member 38 and the armature 16 in either the first position or the second position. The connector 22 of the latching valve assembly 10 in this embodiment only has two terminals, instead of three, as with the previous embodiment. Additionally, there is only one portion of the coil 20a, instead of the coil 20 having a first portion 20a and a second portion 20b.

The operation of the latching valve assembly 10 is substantially the same as described in the previous embodiment, with one of the differences being the magnet 52 being attached to the armature 16, and used for increasing the S/N ratio of the inductance measurement. In this embodiment, the inductance of the coil 20 is measured when the valve member 38 is in either the open position or the closed position, and is stationary (i.e., not transitioning between the open position and closed position as shown in FIG. 5). In this embodiment, a 12 Volt pulse is emitted through the coil 20, and a measurement of the inductance of the coil 20 is then taken. The inductance of the coil 20 changes, depending upon whether the magnet 52 is located in the magnet path 54, or the magnet 52 is not in the magnet path 54. The presence of the magnet 52 in the magnet path 54 increases the signal-to-noise (S/N) ratio of the inductance measurement, whereas if the magnet 52 were not used, the S/N ratio would be insufficient, and the inductance would be difficult to measure. The magnet 52 essentially amplifies the inductance measurement when the valve member 38 is in the open position.

The voltage pulse lasts between 1-15 milliseconds, and is not long enough or strong enough to move the armature 16, but is significant enough such that a change in inductance in the coil 20 is measurable. It should be noted that it is within the scope of the invention that the voltage pulse used to detect the position of the armature 16 and valve member 38 may last for longer or shorter time intervals, as long as the armature 16 and valve member 38 remain stationary. If the valve member 38 is in the open position, the armature 16 is in the second position, and the magnet 52 is in the magnet path 54, the inductance of the coil 20 is at a certain level. If the valve member 38 is in the closed position, the armature 16 is in the first position, and the magnet 52 is not in the magnet path 54, the inductance of the coil 20 is at a different level. The different levels of inductance correspond to the position of the valve member 38 and armature 16. This change in inductance of the coil 20 is therefore used to determine whether the armature 16 and valve member 38 are in the open position or the closed position.

Figure 7:
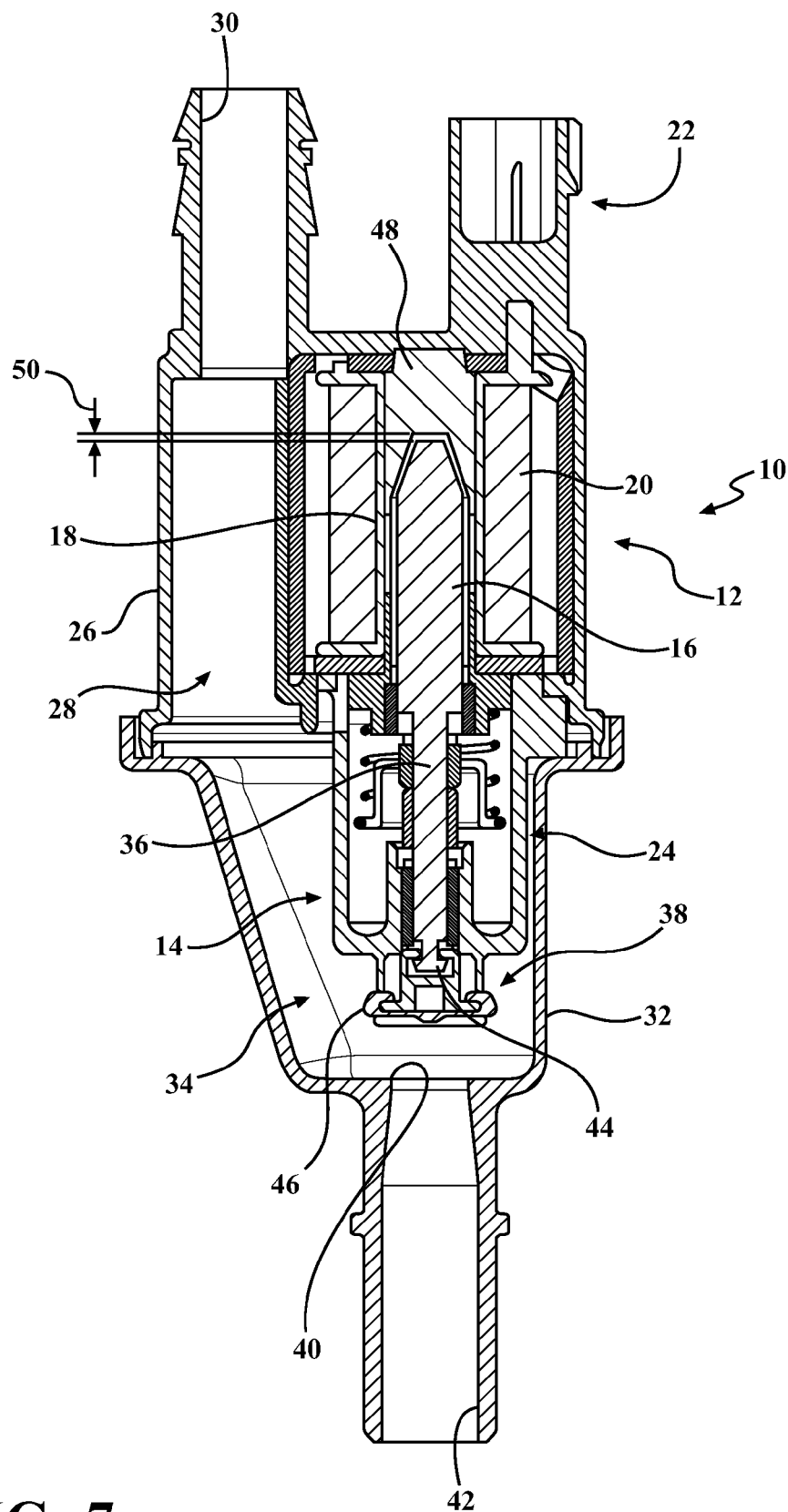
FIG. 7 is a sectional side view of a third embodiment of a latching valve assembly in an open position, according to embodiments of the present invention.
Figure 8:
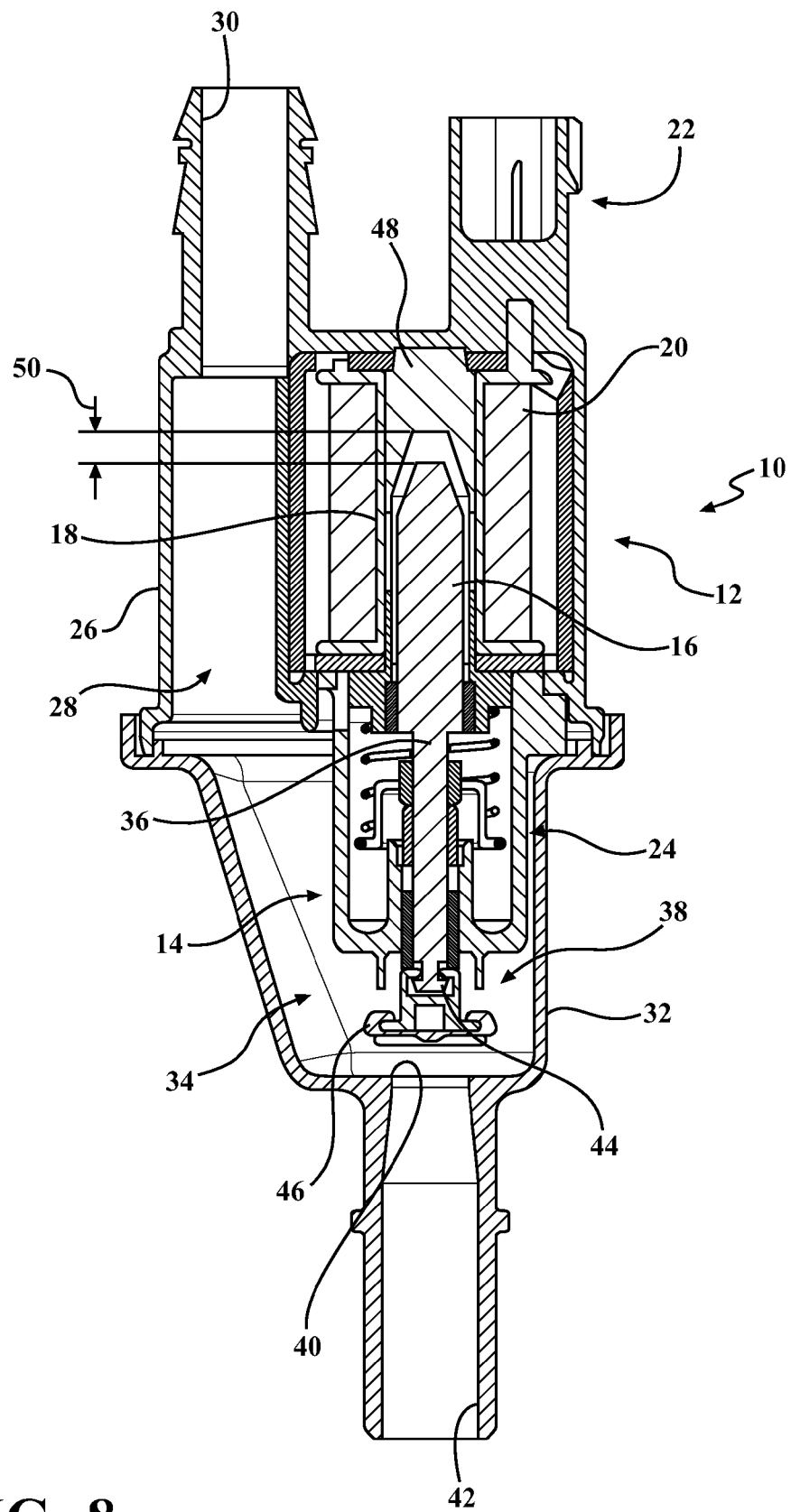
FIG. 8 is a sectional side view of a third embodiment of a latching valve assembly changing between an open position and a closed position, according to embodiments of the present invention.
Figure 9:
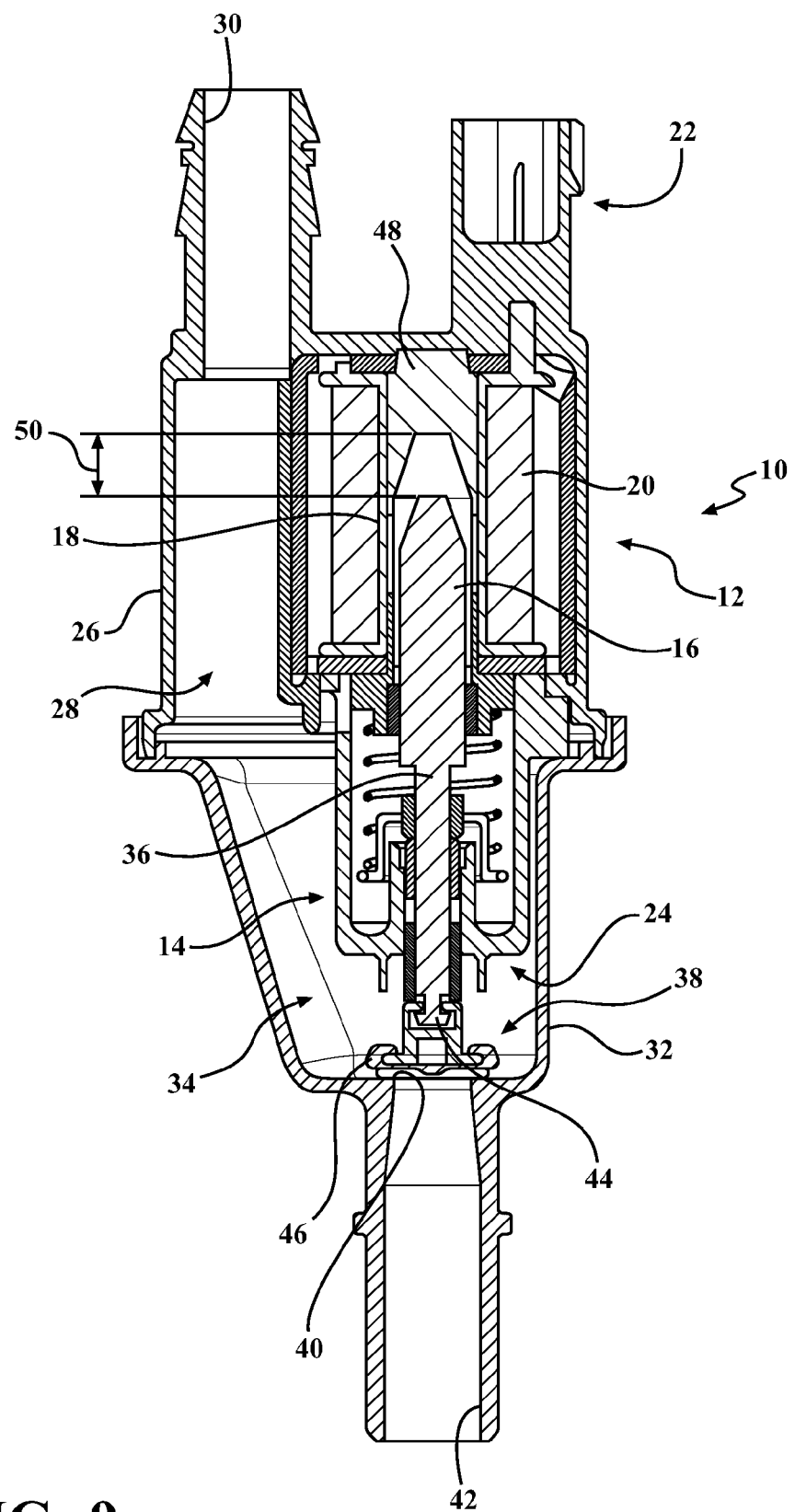
FIG. 9 is a sectional side view of a third embodiment of a latching valve assembly in a closed position, according to embodiments of the present invention.

Another embodiment of the present invention is shown in FIGS. 7-12, and has substantially the same structural configuration as the latching valve assembly 10 shown in FIGS. 4-6, with the exception that the embodiment in FIGS. 7-12 does not have a magnet 52. The solenoid portion 12, the valve portion 14, and the latching mechanism 24 work in substantially the same manner. However, the position of the armature 16, and therefore the valve member 38 is detected by measuring current. The position of the valve portion 14 is able to be detected when the valve portion 14 is in either the open position, as shown in FIG. 7, or the closed position, as shown in FIG. 9. To detect the position of the valve member 38 and the armature 16, a voltage pulse is sent across a sense resistor, and into the coil 20 of the solenoid portion 12. The voltage pulse is not large enough or long enough to move the armature 16, but creates a voltage across the sense resistor that is measured, which then corresponds to the current flowing through the sense resistor. It is within the scope of the invention that the voltage pulse used to detect the position of the valve portion 14 may last for any desired time interval, as long as the armature 16 and valve member 38 remain stationary. This value of the current varies depending on the location of the armature 16, and valve member 38, and therefore the position of the valve portion 14. Although in this embodiment, a sense resistor is used to detect the position of the valve member 38 and armature 16, it is within the scope of the invention that other electrical components in circuits having different configurations may be used.

Figure 10:
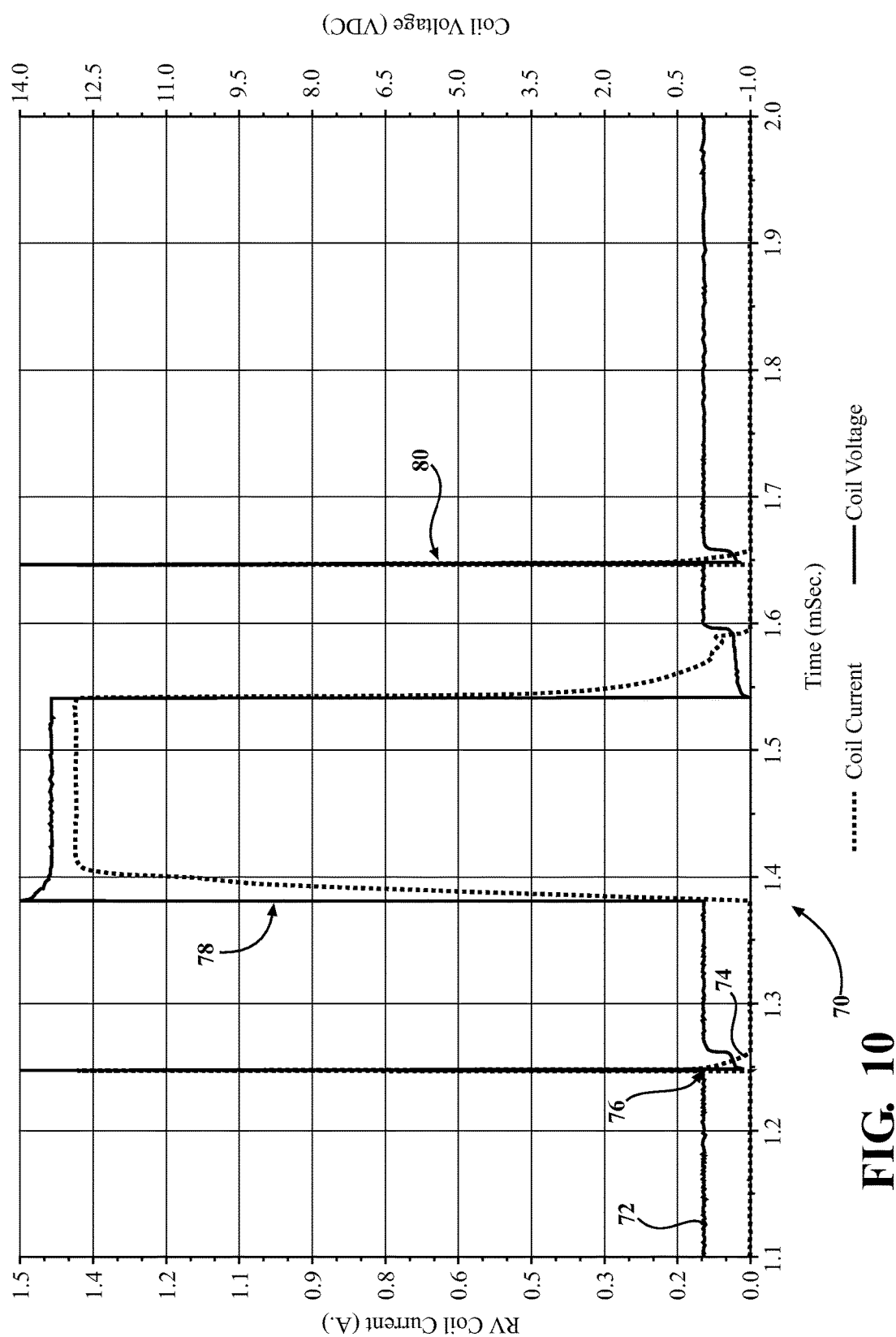
FIG. 10 is a chart depicting the application of voltage to a coil to change the latching valve assembly between the open position and the closed position, and applying a voltage pulse before and after the latching valve assembly changes positions to obtain current measurements to detect the position of the latching valve assembly, according to embodiments of the present invention.

Referring to FIG. 10, a chart, shown generally at 70, depicts the application of a voltage pulse to change the armature 16 and valve member 38 between the open position and the closed position, as well as the application of voltage pulses to detect the position of the armature 16 and the valve member 38. There are two parameters plotted on the chart 70, the first line 72 represents voltage, the second line 74 represents current. This chart 70 shows the voltage 72 at approximately zero up until approximately 1.25 milliseconds, at which point at a first voltage pulse 76 of about 15 Volts for 1.0 milliseconds is applied to the coil 20, and a measurement of current is taken. As shown in FIG. 10, the peak current taken during the 1.0 millisecond pulse was about 0.189 Amps. At about 1.38 milliseconds, a second voltage pulse 78 is applied to the coil 20. This second voltage pulse 78 lasts about 150 milliseconds, but the current measurement is again taken at 1.0 millisecond of the second voltage pulse 78, and as shown in FIG. 10, the peak current measurement at 1.0 millisecond of the second voltage pulse 78 is about 0.179 Amps. The second voltage pulse 78 lasts a longer period of time, and functions to change the position of the valve portion 14 and the latching mechanism 24. A third voltage pulse 80 is applied to the coil 20 at about 1.65 milliseconds. Similarly to the first voltage pulse 76, the third voltage pulse 80 is about 1.0 milliseconds, and a third current measurement is taken at the peak current value during the third voltage pulse 80. As shown in FIG. 10, the peak current measured during the third voltage pulse 80 is about 0.274 Amps. The position of the armature 16 and valve member 38 is then determined by comparing the peak current measurements taken during the first voltage pulse 76 and the third voltage pulse 80. As shown in FIG. 10, the peak current measurement (0.189 Amps) taken during the first voltage pulse 76 is less than the peak current measurement (0.274 Amps) taken during the third voltage pulse 80. The higher of the two current measurements indicates that the armature 16 and valve member 38 are in the closed position, and the lower of the two current measurements indicates that the armature 16 and valve member 38 are in the open position. Therefore, when looking at FIG. 10, armature 16 and the valve member 38 are initially in the open position, and then once the second voltage pulse 78 is applied to the coil 20, the armature 16 and the valve member 38 are in the closed position.

Figure 11:
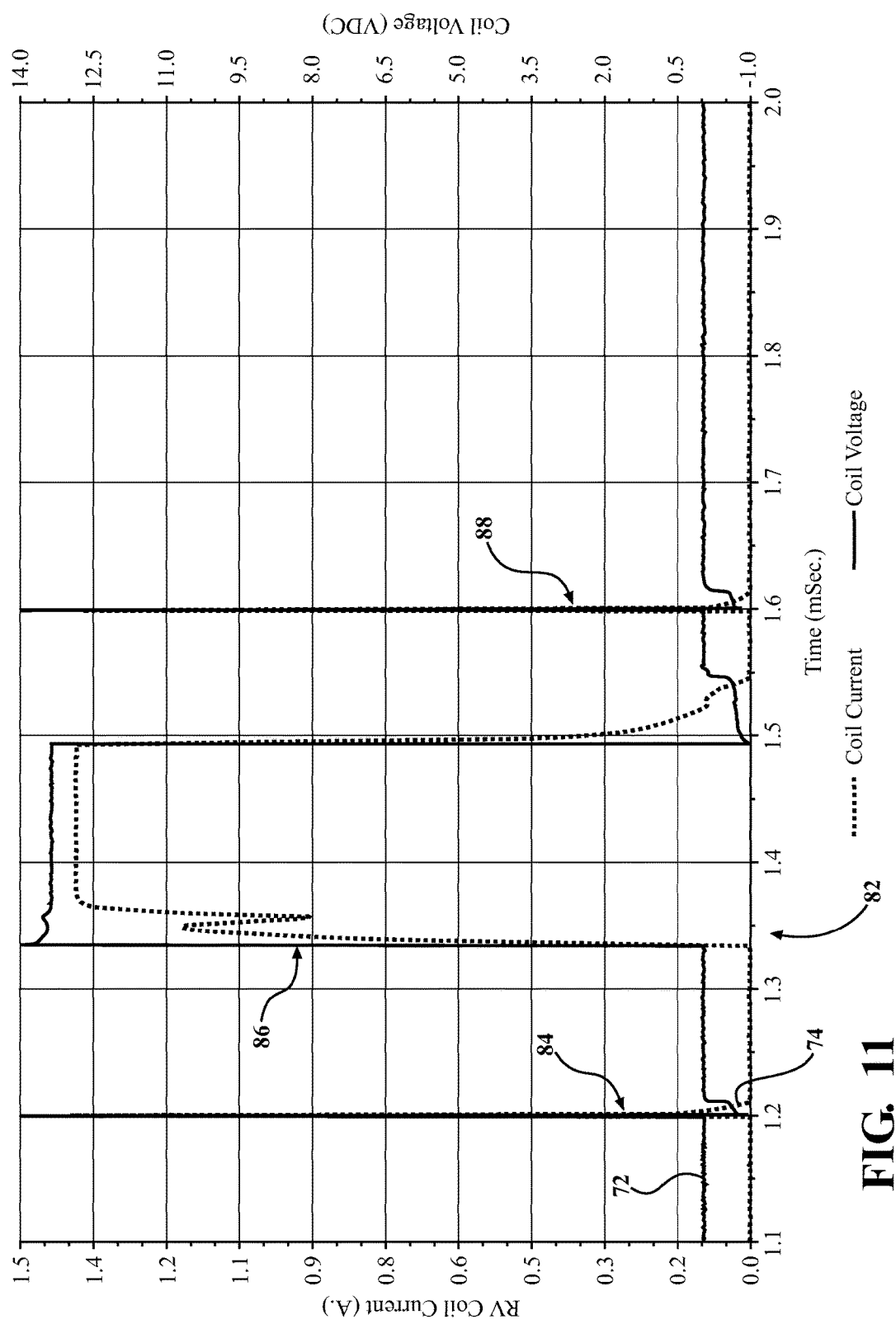
FIG. 11 is a chart depicting the application of voltage to a coil to change the latching valve assembly between the closed position and the open position, and applying a voltage pulse before and after the latching valve assembly changes positions to obtain current measurements to detect the position of the latching valve assembly, according to embodiments of the present invention.

Referring not to FIG. 11, another chart, shown generally at 82, depicts the application of a voltage pulse to change the armature 16 and valve member 38 between the closed position and the open position, as well as the application of voltage pulses to detect the position of the armature 16 and the valve member 38. Both voltage 72 and current 74 are again depicted on the chart 82. On this chart 82, there are again three voltage pulses applied to the coil 20, a fourth voltage pulse 84, a fifth voltage pulse 86, and a sixth voltage pulse 88. The fifth voltage pulse 86 is used to change the position of the armature 16 and valve member 38, and the current measurement is taken at about 1.0 milliseconds of the fifth voltage pulse 86. The fourth voltage pulse 84 and sixth voltage pulse 88 are both about 1.0 millisecond, and are used to detect the position of the armature 16 and valve member 38. Again the current measurements for the voltage pulses 84,88 are the peak current measurements. In FIG. 11, it is shown that the peak current measurement taken during the fourth voltage pulse 84 is about 0.279 Amps, and the peak current measurement taken during the sixth voltage pulse 88 is about 0.183 Amps. The higher of the two current measurements indicates that the armature 16 and valve member 38 are in the closed position, and the lower of the two current measurements indicates that the armature 16 and valve member 38 are in the open position. Therefore, when looking at FIG. 11, armature 16 and the valve member 38 are initially in the closed position, and then once the fifth voltage pulse 86 is applied to the coil 20, the armature 16 and the valve member 38 are in the open position.

Additionally, the voltage pulse being applied for different lengths of time produces different current measurements, which also depends on whether the valve member 38 is in the open position or closed position. Referring to FIG. 12, there are several examples of current measurements taken at different time intervals, which are plotted on the chart 58 shown in FIG. 12. The first of the current measurements are taken from a voltage pulse lasting 1.0 millisecond. The first measurements taken from the 1.0 millisecond pulse are shown at 60a and 60b, where the first curve 60a represents a current measurement taken that corresponds to the armature 16 and valve member 38 being in the closed position, and the second curve 60b represents a current measurement taken that corresponds to the armature 16 and valve member 38 being in the open position, and the magnet 52 is disposed in the magnet path 54. It is shown in the chart 58 that the second curve 60b has a greater peak than the first curve 60a, and the difference between the peaks in the two curves 60a,60b provides an indication of the position of the valve member 38 and armature 16.

The third curve 62a and fourth curve 62b represent current measurements taken when a voltage pulse is applied for about 2.0 milliseconds. The fifth curve 64a and sixth curve 64b represent current measurements taken when a voltage pulse is applied for about 3.0 milliseconds. The seventh curve 66a and eighth curve 66b represent current measurements taken when a voltage pulse is applied for about 4.0 milliseconds. The ninth curve 68a and tenth curve 68b represent current measurements taken when a voltage pulse is applied for about 5.0 milliseconds. The peak of each curve 60a,60b,62a,62b,64a,64b,66a,66b,68a,68b, represents the peak value, or RMS value, of the current at a set time, which in this embodiment is between 1.0 and 5.0 milliseconds, but it is within the scope of the invention that other time periods may be used. More specifically, the voltage pulse may be applied to the coil 20 for any length of time, as long as there is no movement of the valve member 28 and armature 16.

It is also shown in the chart that the longer the voltage pulse, the greater amount of current is measured when the valve member 38 is in either of the open or closed positions. The current measurements taken at 1.0 millisecond are generally less than the current measurements taken at 2.0 milliseconds, the current measurements taken at 2.0 milliseconds are generally less than the current measurements taken at 3.0 milliseconds, the current measurements taken at 3.0 milliseconds are generally less than the current measurements taken at 4.0 milliseconds, and the current measurements taken at 4.0 milliseconds are generally less than the current measurements taken at 5.0 milliseconds.

However, the longer the voltage pulse, the greater the difference in the peak of each current measurement. For example, the difference between the peak of the first curve 60a and the peak of the second curve 60b is about 70 milliamps. When looking at the remaining curves on the chart 58, it is shown that the difference between the peak of the third curve 62a and the peak of the fourth curve 62b is about 90 milliamps, the difference between the peak of the fifth curve 64a and the peak of the sixth curve 64b is 150 milliamps, the difference between the peak of the seventh curve 66a and the peak of the eighth curve 66b is 180 milliamps, and the difference between the peak of the ninth curve 68a and the peak of the tenth curve 68b is 290 milliamps.

One of the advantages of the present invention is that there is no need to change the construction of the valve assembly 10. The current measurement, and therefore the position of the valve member 38 and armature 16, is therefore detected by measuring the current in the coil 20 after applying the voltage pulse to the coil 20 for a specified time period. The specified time period of the voltage pulse may be any desired time period, as long as the valve member 28 and armature 16 remain stationary during the application of the voltage pulse. In yet another embodiment of the present invention, the magnet 52 may be attached to the armature 16, and used for increasing the S/N ratio, and therefore improve the signal of the current measurement.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A latching valve assembly, comprising:
   a solenoid portion having a movable armature and a stationary coil, a permanent magnet being coupled to the movable armature;
   a valve portion having an open position and a closed position, the valve portion being movable with the movable armature, with the permanent magnet amplifying inductance of the stationary coil when the valve portion is in the open position;
   a latching mechanism connected to the valve portion, the latching mechanism maintaining the position of the valve portion in the open position or the closed position when the solenoid portion is deactivated; and
   a single voltage source connectable with the stationary coil such that when a first voltage pulse of the single voltage source is supplied to the stationary coil, the movable armature moves the valve portion between the open position and the closed position, and such that when a second voltage pulse of the single voltage source is supplied to the stationary coil, induction in the stationary coil changes dependent on a location of the permanent magnet while the movable armature and valve portion remain stationary, so as to enable detection of a position of the valve portion by monitoring a change of the induction of the stationary coil,
   wherein the magnet is disposed in a magnet path when the valve portion is in the open position, and the magnet is out of the magnet path when the valve portion is in the closed position.

2. The latching valve assembly of claim 1, wherein a different level of current is measured when the magnet is in the magnet path compared to when the magnet is out of the magnet path, such that the level of current measured corresponds to the valve portion being in the open position or the closed position.

3. The latching valve assembly of claim 1, wherein a time interval of the first voltage pulse is greater than a time interval of the second voltage pulse.

4. A method for determining the position of a latching valve assembly, comprising the steps of:
   providing a solenoid portion having a movable armature and stationary coil;
   providing a valve portion movable with the movable armature between an open position and a closed position;
   providing a latching mechanism connected to the valve portion, the latching mechanism used for holding the valve portion in the open position, and for holding the valve portion in the closed position;
   actuating the stationary coil with a first voltage pulse of a single voltage source to move the movable armature and valve portion between the open position and the closed position; and
   actuating the stationary coil with a second voltage pulse of the single voltage source such that the movable armature and valve portion remains stationary while monitoring a change of inductance or current associated with the stationary coil to thereby determine a position of the valve portion,
   providing a magnet attached to the movable armature, the magnet being located in a magnet path when the valve portion is in the open position, and the magnet being located out of the magnet path when the valve portion is in the closed position;
   wherein the inductance of the stationary coil changes based on a position of the magnet relative to the magnet path.

* * * * *